W. H. SAUVAGE.
SLACK ADJUSTER.
APPLICATION FILED JAN. 31, 1918.
1,298,571.
Patented Mar. 25, 1919.
2 SHEETS—SHEET 1.
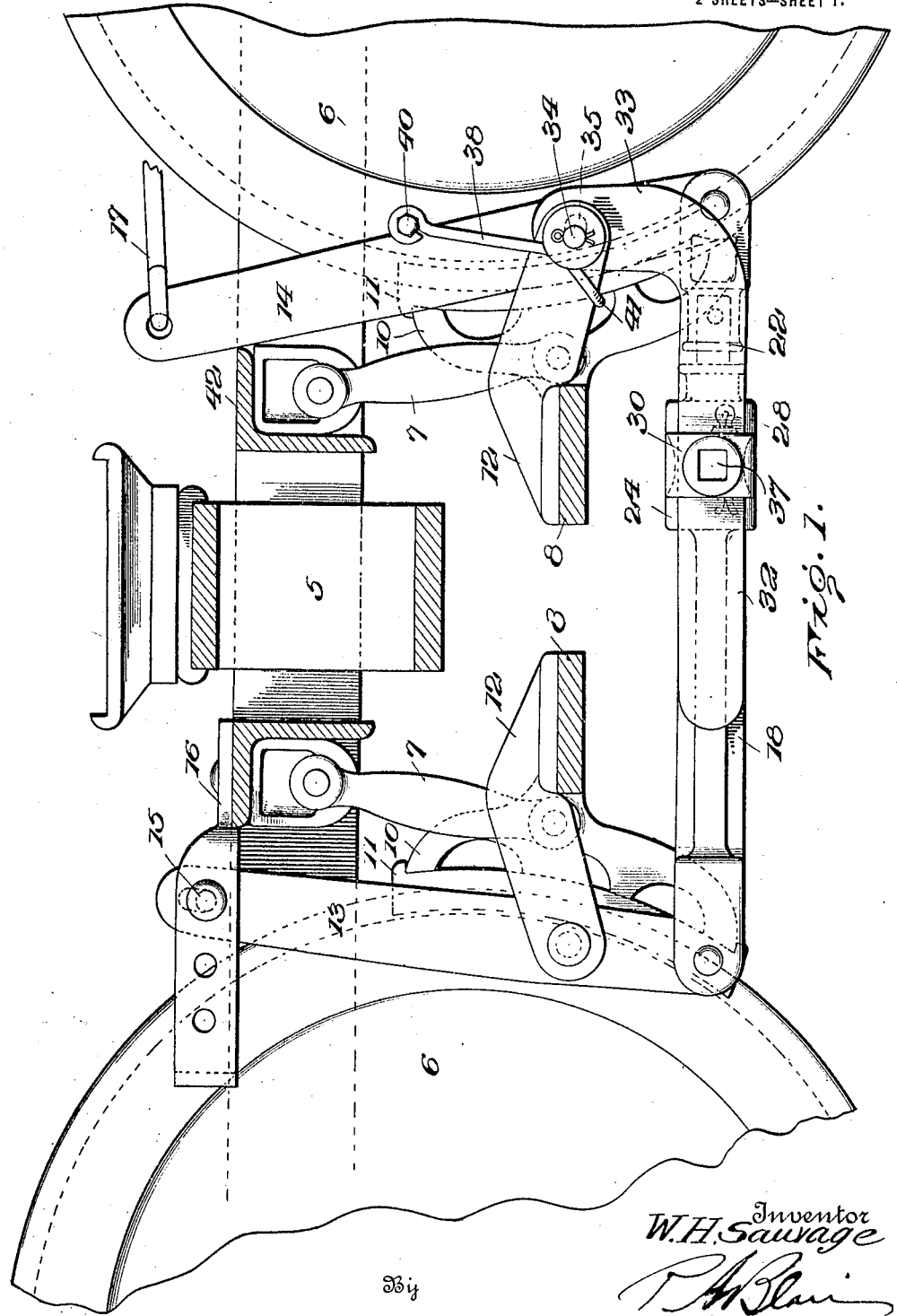
Inventor
W. H. Sauvage
By
Attorney

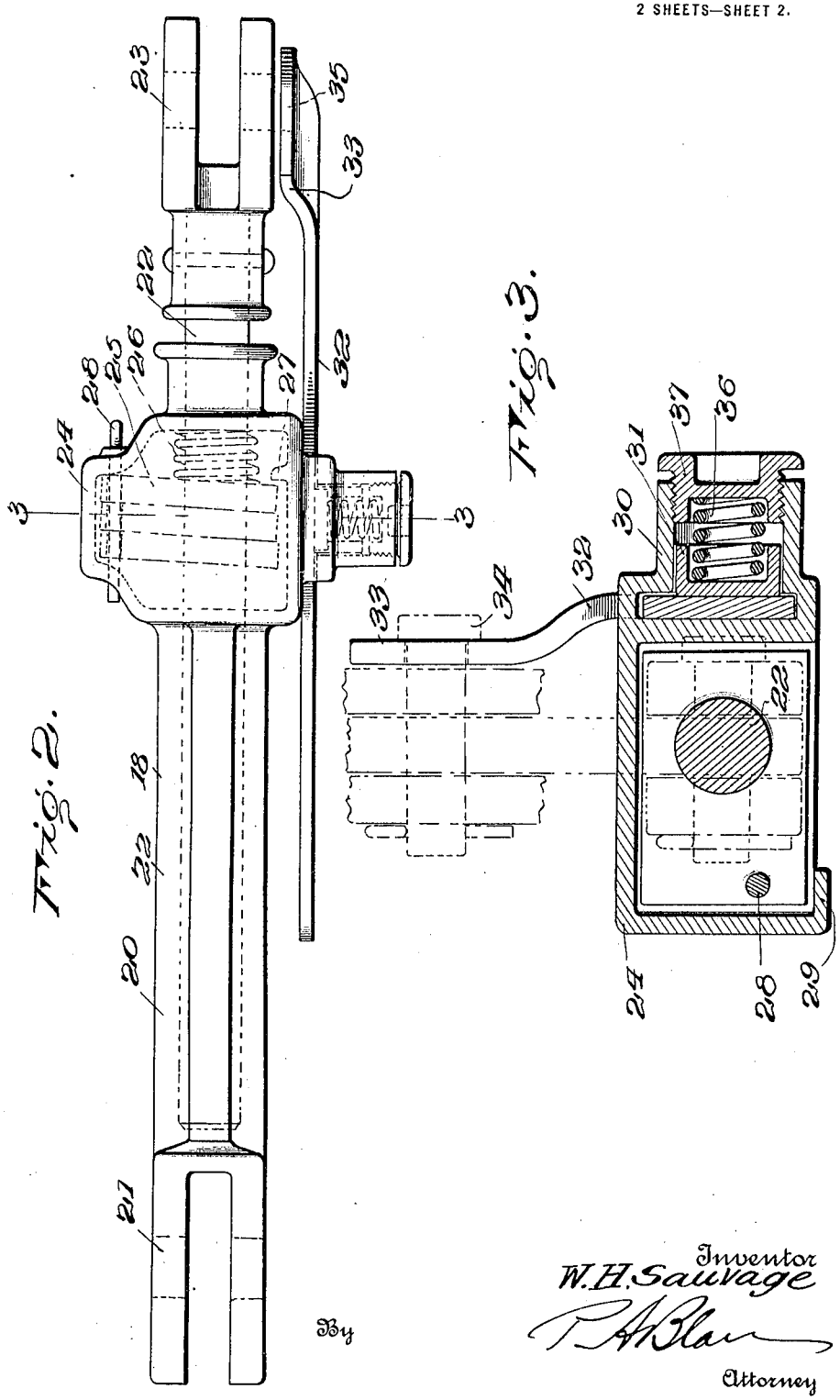

UNITED STATES PATENT OFFICE.

WILLIAM H. SAUVAGE, OF FLUSHING, NEW YORK, ASSIGNOR, BY MESNE ASSIGNMENTS, TO GOULD COUPLER COMPANY, OF NEW YORK, N. Y.

SLACK-ADJUSTER.

1,298,571.  Specification of Letters Patent.  Patented Mar. 25, 1919.

Application filed January 31, 1918. Serial No. 214,684.

*To all whom it may concern:*

Be it known that I, WILLIAM H. SAUVAGE, a citizen of the United States of America, residing at Flushing, Long Island, in the county of Queens and State of New York, have invented certain new and useful Improvements in Slack-Adjusters, of which the following is a specification.

This invention relates to slack adjusters particularly adapted for use on two-wheel trucks of trolley cars, although it is, of course, not to be confined to such application.

One of the objects of the present invention is to provide a simple and commercially practical automatic slack adjuster adapted to take up the slack in the brake rigging due to the wear of the parts. Another object is to provide an automatic slack adjuster of the above general type which will be more reliable and efficient in use and operation than heretofore. A further object is to provide a slack adjuster having relatively few parts which may be inexpensively made, compactly arranged and conveniently applied to brake rigging now in use without material modification.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which Figure 1 is a side elevational view partly in section of a truck and brake rigging with the slack adjuster applied thereto;

Fig. 2 is a plan view of the slack adjuster by itself;

Fig. 3 is a sectional view taken substantially on the line 3—3 of Fig. 2.

Referring now to the drawing in detail and more particularly to Fig. 1, 5 denotes a transverse member of the truck frame at either side of which are positioned wheels 6 and hangers 7 supporting brake means 8 carrying the usual brake shoe heads 10 and shoes 11 all of well known construction. Connected with the brake beams 8 are struts 12 providing fulcrums for brake levers 13 and 14. The dead lever 13 is adjustably suspended at 15 from a bracket 16 secured to the truck frame in any one of several positions. The live lever 14 has its upper end connected by means of link or pull rod 17 with a power cylinder or other brake actuating means (not shown) and the lower ends of the levers 13 and 14 are connected by means of an expansible push rod 18, as more clearly shown in Fig. 2 and forming part of the slack adjuster for permanently taking up and holding the slack.

This push rod comprises a tubular member 20, as shown in Fig. 2, pivotally connected with the lower end of the dead lever 13 by means of a bolt passing through an opening 21. Slidably mounted within this tubular member 20 is a solid push rod 22 having an opening 23 for connection with the lower end of the live lever.

The tubular member 20 has an enlarged rectangular portion or housing 24 at one end adapted to contain a plurality of holding dogs 25 of rectangular shape each provided with openings having case hardened edges through which the rod 22 is adapted to pass. These dogs are normally held in canted position, as shown in Fig. 2, by means of a spiral spring 26 surrounding the push rod 22 and reacting between an end wall of the housing and the adjacent dog. A stop 27 prevents movement of the dogs beyond a position transverse to the push rod 22 when it is desired to release the same as fully explained in my prior Patent No. 1,227,940, dated May 29, 1917. A pin 28 passes through one side of the housing and prevents the dogs from dropping down at one side through the open bottom of the housing as will appear clear from an inspection of Fig. 3, thereby preventing the corners from catching on the sides of the housing and sticking. This pin is not essential, for a gib 29 on the underside of the housing will accomplish substantially the same result.

Integrally formed with the housing is an auxiliary housing or second chamber 30 having a follower 31 bearing against one of the adjacent side faces of an adjusting rod 32, one end 33 of which is turned upwardly, as shown in Fig. 1, to coact with pin 34 forming the fulcrum point of the live lever. It will be noted that an opening 35 through which this pin passes is elongated to permit predetermined lost motion for brake shoe clearance.

Referring back to Fig. 3, the auxiliary housing 30 contains a spiral spring 36 held in position by a threaded follower nut 37 which may be screwed up to produce the desired degree of yielding friction between the adjusting rod 32 and the follower 31.

Any suitable form of return spring may be used to restore the parts to normal position after the braking operation, but I prefer to use that type of general U-shaped construction as more clearly shown in my above referred to prior patent. This spring 38 has it upper end members connected by means of bolt 40 passing through suitable eyes and engaging the side edge of the live lever 14. Its central parts are then wound one or more times about the pin 34 and looped at 41 under the strut 12 in such a manner that when the brakes are applied, the turns will be placed under tension, and on release will restore the lever 14 to its normal release position against a stop 42 of the transverse frame-work.

The operation of this device is substantially as follows:

Assuming the brakes to be in release position as shown in Fig. 1, on application of the brakes the rod 17 moves toward the right which carries the upper end of the live lever 14 therewith. The brake shoe clearance is first taken up through the lost motion slot 35 which brings the shoes into engagement with the periphery of the wheels. If any excess travel takes place due to wear of the parts and particularly the brake shoes, the adjusting rod 32 slides between the follower plate 31 and the adjacent dividing wall of the housing 24 an amount equal thereto, thus for the time being temporarily taking up and holding the excess travel. On release of the brakes the return spring 38 will tend to restore the lever to normal position and will first cause the live and dead levers with their associated brake shoes to drop away from the wheels as permitted by reason of the brake shoe clearance slot 35. The friction clamp 31 will then hold while the pivot pin 34 acts as a fulcrum about which the live lever continues its return movement. This will consequently cause the lower ends of the live lever to pull out the push rod 22 from the tubular housing 20 an amount corresponding to the excess travel, for the rod 22 is free to slip through the dogs 25 in a right-hand direction, but is prevented from moving relatively toward the left on application of the brakes due to the canted position of the dogs. If the friction with which the follower 31 engages the adjusting rod is insufficient, the nut 37 may be tightened by turning the same as by means of a wrench inserted in the square depression in its end. It is highly desirable that this friction clamp should be so constructed and adjusted as to yield in one direction under normal operation to take up the slack, yet normally hold firm on return of the brakes to normal position. Under certain abnormal conditions, however, it is necessary that a slight sliding movement should take place to avoid bending of the adjusting rod. For this reason a readily adjustable friction clamp of inexpensive construction that will yield in one direction only under normal operations is highly desirable.

It will be found that the present construction also possesses certain advantages over those shown in my prior patents, particularly in the ease of manufacture, the reduction in expenses incident thereto and the greater reliability and efficiency of operation. The dogs are always held in proper relative position with respect to the push rod and the temporary and permanent take up and holding devices are associated in one housing whereby the same may be more easily constructed and compactly arranged.

It is thus seen that the present invention provides a simple and practical automatic slack adjuster of relatively inexpensive construction which may be easily and quickly applied to brake rigging now in general use without material modification.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. An automatic slack adjuster comprising a tubular member, a member coacting therewith, an adjusting rod, and a housing formed integrally with said tubular member having permanent take up and holding means and temporary take up and holding means therein, said temporary take up mechanism including an adjusting rod and a yielding friction block within the housing coacting with said rod.

2. In an automatic slack adjuster comprising a two-part telescopic push rod, an adjusting rod lying substantially parallel thereto, the outer part of said push rod including an integrally formed housing having two chambers through which the other part of said push rod and adjusting rod respectively pass, positively acting means in one chamber adapted to permanently take up the slack, and spring pressed yielding friction means in the other chamber coacting with said adjusting rod adapted to temporarily take up the slack when said adjusting rod moves in one direction and to permit said rod to yield in the other direction under abnormal conditions.

3. An automatic slack adjuster comprising, in combination, a two-part telescopic push rod, the outer part constituting an integrally formed housing containing two chambers, permanent take up and holding means in one of said chambers coacting with the other part of said telescopic push rod, yielding temporary take up and holding means associated with the other chamber, and an adjusting rod with which said last mentioned means is adapted frictionally to coact.

4. An automatic slack adjuster comprising, in combination, a two-part telescopic push rod, the outer part having a housing containing two chambers, permanent take up and holding means in one of said chambers coacting with the other part of said telescopic push rod, temporary take up and holding means within the other chamber, and an adjusting rod with which said last mentioned means is adapted to coact, both temporary and permanent take up and holding means including spring means for urging the parts into operative position.

5. In an automatic slack adjuster, in combination, a two-part telescopic push rod, one of said parts comprising a chamber through which the other part is adapted to pass and having a second chamber formed integrally therewith and an adjusting rod passing through said second chamber and yielding means adapted to maintain the relative position between the adjusting rod and the part of said push rod forming the chamber.

6. In an automatic slack adjuster, in combination, a two-part telescopic push rod, and an adjusting rod, one of said parts of the telescopic push rod having two chambers through which the other part of said telescopic push rod and the adjusting rod are adapted to pass respectively, and spring actuated means in each chamber adapted to coact in taking up the excess slack.

7. A slack adjuster comprising, in combination, a two-part telescopic push rod, one of said parts containing a housing, a plurality of dogs within said housing and normally held in canted position, and means to prevent said dogs from dropping down from normal position.

8. A slack adjuster comprising, in combination, a two-part telescopic push rod, one of said parts containing a housing, a plurality of dogs within said housing, and means to prevent said dogs from dropping down from normal position, said means comprising a pin passing through the housing and supporting the dogs therefrom.

9. A slack adjuster comprising, in combination, a two-part telescopic push rod and an adjusting rod, a housing associated with said push rod through which the adjusting rod passes, and a spring actuated means adapted to frictionally engage the side of said adjusting rod.

10. A slack adjuster comprising, in combination, a two-part telescopic push rod, an adjusting rod, a housing associated with said push rod through which the adjusting rod passes, a spring actuated follower plate adapted to frictionally engage said adjusting rod, and means for adjusting the degree of pressure with which said follower plate engages said adjusting rod.

11. A slack adjuster comprising, in combination, a two-part telescopic push rod, an adjusting rod, a housing associated with said push rod through which the adjusting rod passes, a spring actuated follower plate adapted to frictionally engage the side of said adjusting rod, and means for adjusting the degree of pressure with which said follower plate engages said adjusting rod, said last mentioned means comprising a threaded nut screwed into the housing and coacting with the spring.

12. An automatic slack adjuster comprising a tubular member, a rod telescoping therewith, an adjusting rod substantially parallel to said first mentioned rod, a housing integrally formed with said tubular member, permanent take up mechanism coacting with said first rod and temporary take up mechanism coacting with said second rod, both of said mechanisms being concealed and protected within said housing.

13. A slack adjuster mechanism including a tubular member provided with a housing open on its under side, a rod coacting with said tubular member, and a plurality of dogs within said housing disposed at an angle to said rod and a pin passing through the dogs and coacting with the housing adapted to prevent accidental movement of said dogs.

14. A slack adjuster mechanism including a tubular member provided with a housing open on its under side, a rod coacting with said tubular member, and a plurality of dogs within said housing disposed at an angle to said rod, a pin passing through the dogs and coacting with the housing adapted to prevent accidental movement of said dogs, and a chamber at one side of said housing having a spring actuated friction shoe positioned therein.

15. A slack adjuster mechanism including a tubular member provided with a housing open on its under side, a rod coacting with said tubular member, and a plurality of dogs within said housing disposed at an angle to said rod, a pin passing through the dogs and coacting with the housing adapted to prevent accidental movement of said dogs, and a chamber at one side of said housing having a spring actuated friction shoe positioned therein, and means for adjusting the tension of said shoe.

16. An automatic slack adjuster comprising a tubular member and a rod adapted to telescope therewith, a housing formed integrally with said tubular member and permanent and temporary take up mechanisms protected within said housing, said temporary take up mechanism including a yielding friction dog and a rod engaged thereby adapted to permit relative movement between the dog and rod under abnormal conditions.

17. An automatic slack adjuster comprising a tubular member and a rod adapted to telescope therewith, a housing formed integrally with said tubular member and permanent and temporary take up mechanisms protected within said housing, said temporary take up mechanism including an adjusting rod and a spring held friction dog engaging said rod thereby to permit relative movement under abnormal conditions, and means for adjusting the tension of said spring.

In testimony whereof I affix my signature in the presence of a witness.

WILLIAM H. SAUVAGE.

Witness:
G. H. DIETZ.

Copies of this patent may be obtained for five cents each, by addressing the "Commissioner of Patents, Washington, D. C."